(No Model.)
S. H. SHORT.
METHOD OF AND MEANS FOR ELECTRIC GENERATION.
No. 569,591. Patented Oct. 13, 1896.
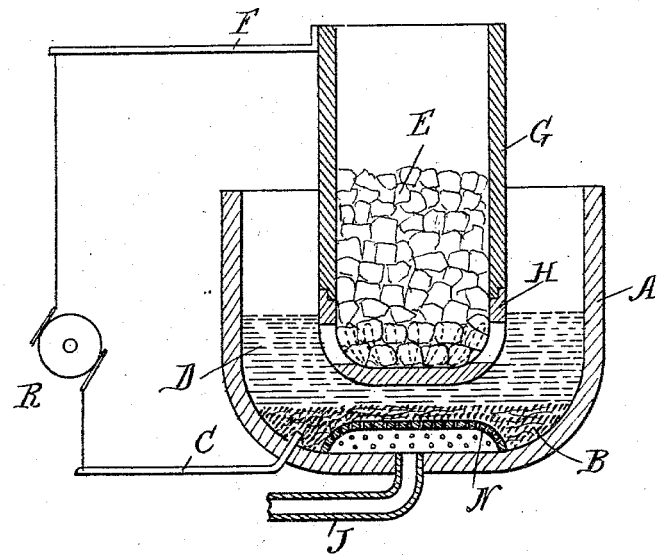
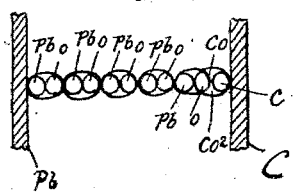
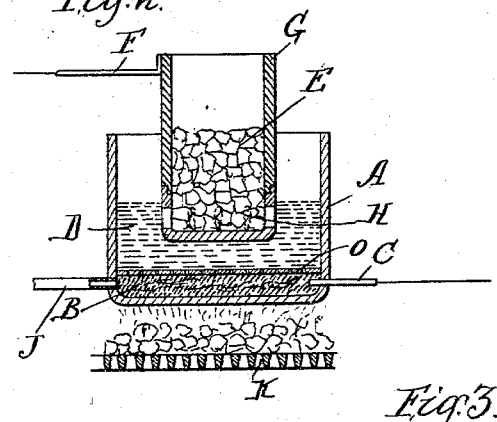
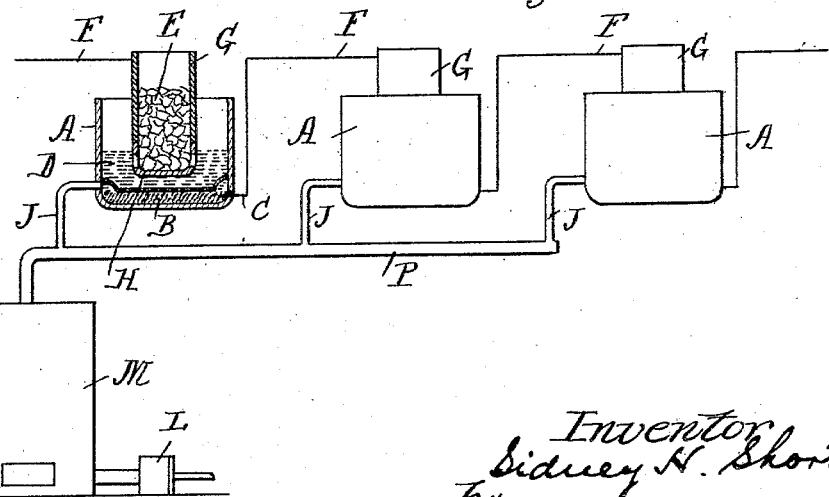
Witnesses.
Inventor
Sidney H. Short
by Morrow & Darby, atty's

UNITED STATES PATENT OFFICE.

SIDNEY H. SHORT, OF CLEVELAND, OHIO.

METHOD OF AND MEANS FOR ELECTRIC GENERATION.

SPECIFICATION forming part of Letters Patent No. 569,591, dated October 13, 1896.

Application filed April 9, 1896. Serial No. 586,798. (No model.)

*To all whom it may concern:*

Be it known that I, SIDNEY H. SHORT, a citizen of the United States, residing at Cleveland, in the county of Cuyahoga and State of Ohio, have invented a new and useful Method of and Means for Electric Generation, of which the following is a specification.

Electricity has long been produced by the oxidation of various metals. A familiar example is the oxidation of zinc in the ordinary Daniells cell. The oxidation is effected through a suitable electrolyte, which, in the example given, is a solution of sulfate of copper, into which a plate of metallic zinc is immersed, metallic zinc being one of the most positive plates in an electrolyte of this character. In the example mentioned a copper plate is employed as the negative plate of the battery. The electrochemical action which takes place in a battery-cell is not altogether thoroughly understood, except as to the results. In the case of a Daniells cell, for instance, it is known that the sulfate of copper forming the electrolyte is broken up into its constituents, the copper being deposited upon the copper plate or negative plate of the cell and the oxygen of the sulfuric acid attacking and oxidizing the metallic zinc forming the positive plate of the cell, the resulting oxid of zinc being in turn converted into sulfate of zinc, which passes into solution with the excess of water contained in the electrolyte. I have selected the Daniells cell as merely illustrative of the idea. Other materials may be employed as the positive and negative elements of the cell and other materials may be employed for the electrolyte, and many forms of batteries have been devised based upon the utilization of different materials, but in all cases the production or generation of electricity is dependent upon the oxidizing or electrochemical action of the electrolyte upon the positive plate of the battery. Therefore one of the essentials of an electrolyte in this connection is that it must contain oxygen in large quantities, the action of the oxygen upon the positive plate of the battery-cell effecting—during the oxidizing process—a consumption of said plate and the conversion thereof into oxids or other chemical compounds. The zinc or other metals or materials employed in the manner indicated form an expensive fuel to be oxidized and consumed in this way.

It is therefore the object of the present invention to apply the same principle to the utilization of coal or carbon or carbonaceous material as the substance to be electrochemically acted upon, such material being cheap and abundant, and I propose to subject the coal or carbon or carbonaceous material to the electrochemical action of a suitable electrolyte which is capable of receiving and furnishing sufficient oxygen to effect a suitable oxidation of the carbon or carbonaceous material.

In this specification I shall employ the term "carbon" in a broad generic sense, including coal, both bituminous and anthracite, coke, gas-carbon, and, in fact, any and all forms of carbonaceous matter.

It is well known that carbon has a great affinity for oxygen and that when they are brought into contact with each other at a proper temperature, as when coal is heated in the presence of the oxygen of the air, the carbon and oxygen unite into chemical combination and the potential energy of the carbon is converted into heat. This is known as "combustion." In the same manner so great is the chemical affinity of carbon for oxygen that carbon, as is well known, will, under a suitable degree of temperature, reduce the oxids of nearly all metals, even those which are the most electropositive.

In a practical application of the principles of oxidation as above mentioned due regard must be had to the fact that the direct oxidation of carbon, as in the process of combustion, does not give a satisfactory source of electromotive force. For instance, in the case of batteries of all kinds the oxygen is not furnished directly to the positive plate, but in order to produce a high electromotive force it is necessary to furnish the oxygen to the negative plate, from which it is transferred electrochemically, through the intervening electrolyte, to the positive plate in order to accomplish its oxidizing effect upon the positive plate. For instance, in charging a storage battery consisting of lead plates in a solution of sulfuric acid the negative plate is oxidized, while the positive plate has given up its oxygen and is reduced to spongy metallic lead, and when the battery is discharged the positive and negative plates become, respectively, the negative and positive poles of the battery and the reverse of the above operation takes place, that is, the previously-oxidized plate yields its oxygen and is reduced to spongy metallic lead, while the previously-reduced spongy lead plate becomes oxidized by an electrochemical transference of the oxygen so yielded through the electrolyte.

A practical method of oxidizing carbon, as above explained, solves the problem of converting the potential energy of coal directly into electrical energy, and an apparatus which will successfully accomplish this end will provide a means of furnishing electrical energy in large quantities and at small cost for commercial purposes and will avoid the necessity of converting the potential energy of coal into steam to drive an engine and therefrom to actuate a generator as a source of electrical energy, as is at present the universal custom, with its consequent and enormous loss of efficiency during the various transformations and instrumentalities through which the original or potential energy of the coal is applied.

I propose to make use of the principles above mentioned and to apply the same practically to accomplish the direct conversion of the potential energy of carbon into electrical energy.

In the accompanying drawings, Figure 1 is a view in vertical section of an illustrative form of apparatus for carrying my invention into practical effect. Fig. 2 is a similar view showing a slightly-modified arrangement thereof. Fig. 3 is a view, partly in section and partly diagrammatic, illustrating a practical application of the principle of my invention. Fig. 4 is a diagram illustrating the theory of electrochemical action which takes place in carrying out my invention.

In carrying out my invention, whereby electrical energy is produced directly from the oxidation of coal, coke, or carbonaceous material, I provide a vessel or receptacle A, of suitable size, shape, and material, into which I place a suitable material B, possessing the necessary qualities to form the negative plate or element, for instance, lead, though I mention lead as merely illustrative of an operative element, and it will be distinctly understood that many other and different materials possessing the requisite qualities may be employed for this purpose. I do not confine or limit myself, therefore, to the use of lead in this connection. Lead is mentioned because, as I have discovered, it is electronegative, in the presence of lead oxids acting as an electrolyte to carbon, and this is a quality essential to the ends sought. I also introduce into the vessel A an electrolyte D, suitable to the purposes desired and materials employed. For instance, in the case of the use of lead as the negative element I may employ an oxid or oxids of lead as the electrolyte. It will be understood, however, that my invention is not limited in this respect to the specific electrolyte named. In electrical connection with the negative plate is arranged a suitable conductor or wire C, forming the positive pole of the couple. The carbon E, in whatever form it is used, is arranged to be partially immersed in the electrolyte and constitutes the positive plate, and in electrical connection with the carbon is a suitable conductor or wire F, forming the negative pole of the couple. A convenient way in which this electrical connection can be made is shown, as merely illustrative of the idea, and I desire it to be understood that I do not limit myself thereto, wherein I feed the carbon into a suitable tube or other vessel G of conducting material, and so arranged that the coal at the lower end thereof may be immersed in the electrolyte, and the conductor F is arranged in electrical contact with said vessel or tube G. If desired, I may form that portion of the tube or vessel G which is immersed in the electrolyte with a basket or vessel H of clay or other suitable non-conducting material which will not be acted upon by the electrolyte during the operation of the apparatus. This non-conducting portion of the carbon-holder may be suitably perforated, as shown, to permit the electrolyte to come in contact with the carbon in order to effect an oxidation thereof.

Of course it will be understood that the carbon may be formed into rods or bars, if convenient and in a well-known manner, and partially immersed in the electrolyte. In such case it will be evident that the conductor F may be connected directly to the carbon itself and the use of the vessel G or the non-conducting portion H avoided.

In an arrangement such as above described the carbon is slowly consumed through the electrochemical action of the electrolyte, the metal constituent of the electrolyte being deposited upon the negative plate B or metal employed as the negative plate, while carbonic-acid gas is developed or generated through the oxidation of the carbon and which is carried off into the air. If this action should continue without more oxygen being supplied to the electrolyte, it is evident that eventually the electrolyte would become exhausted of oxygen, which would pass off in the form of carbonic-acid gas, while the metal constituent of the electrolyte would be deposited upon the negative plate in the free state, and hence the action of the cell would cease. It is important, therefore, to supply oxygen to the electrolyte. This may be accomplished in many ways. For instance and by way of illustration of the principles involved, I may introduce air to the electrolyte, whereby the supply of oxygen in the electrolyte is replenished. The mere introduction of oxygen to the electrolyte, however, is insufficient and does not result in a satisfactory production of electromotive force. It is necessary, in order to secure satisfactory results, that the oxygen first attack the metal of the negative plate in order to convert a portion thereof into oxids, which in turn form the electrolyte, and which acts as a medium of transference for the oxygen during the electrochemical action which takes place, which finally reaches the carbon or positive plate and effects an oxidation, the oxygen of the metallic oxid which forms the electrolyte combining with the carbon, while the free metal, set free again, combines with oxygen.

The air or other combination of oxygen may be introduced in any desired or convenient manner. As illustrative of the idea I have shown an air-pipe J communicating with the bottom of the receptacle or vessel A, and through which air may be supplied to said receptacle or vessel in any convenient manner.

It will be understood that electrolytes may be used which will combine with the oxidized carbon to form carbonates instead of carbonic-acid gas, but in such case they should be of such character that the carbonates so produced will be decomposed, and hence the products of oxidation of the carbon may be finally gotten rid of in the form of carbonic acid.

In order to obtain the best results and to facilitate the combination of the carbon in the practical operation of my invention, and to hasten the electrochemical action of the cell, it is important that the temperature of the carbon be raised to a point where the nascent oxygen of the electrolyte will attack the carbon vigorously and freely. This object may be attained in a vast variety of ways, and while I have shown as illustrative of an operative means for accomplishing the desired objects an arrangement of apparatus I desire it to be distinctly understood that my invention is not in any manner limited or restricted to the details of construction and arrangement shown and described. In the particular form shown in Fig. 2 I arrange the vessel A to be heated over any suitably or conveniently arranged grate K.

In the form shown in Figs. 1 and 3 the heating is shown as being effected by introducing heated air, the air in this instance not only supplying the requisite heat, but also replenishing the supply of oxygen to the electrolyte through the negative plate, as above explained. Any desired or convenient arrangement of apparatus for heating and delivering the air to vessel or receptacle A may be employed. By way of illustration, an air-pump L may be employed to pump the air through a suitably arranged and constructed furnace M, where it is heated, and thence to the vessel or receptacle A through the pipe J. In this manner, whether directly from the heat of grate K, as in Fig. 2, or from the heat of the heated air, as in Figs. 1 and 3, not only is the carbon heated to the desired degree to give the best results, but also the electrolyte D and the negative plate B are thereby maintained in heated condition, maintaining a uniform temperature and maintaining the negative plate of the cell in a state better adapting it to take on the oxygen from the air to form an oxid from a portion of the metal of such negative plate, and maintaining the electrolyte in a state enabling it to receive such oxid and transfer the oxygen thereof to the carbon, and maintaining the carbon at a suitable degree of temperature to be readily and freely attacked by the oxygen of the electrolyte, all of these being conditions favorable to the attainment of the best possible results. In the case of some metals employed as the negative plate, say, by way of illustration, lead, the negative plate and also the oxid or oxids of lead forming the electrolyte are maintained in molten state during the action of the apparatus.

It is desirable that the air or other form of oxygen be supplied to the negative plate in such manner that it will be distributed throughout the mass of the molten metal. This idea may be carried out practically in many ways. As illustrative of the idea, I have shown in Fig. 1 an arrangement wherein the air is introduced through pipe J to the bottom of the vessel or receptacle A, and immediately over the delivery end of said pipe is arranged a perforated shield N, forming substantially a false bottom to the vessel or receptable. The air delivered to the vessel is forced through the perforations in this shield or plate, and hence is distributed throughout the mass of molten metal. A similarly arranged and perforated plate O is shown in Figs. 2 and 3, whereby the same objects are secured. It will be seen that the bubbling of the air or oxygen up through the molten mass not only serves to maintain throughout the entire mass a uniform temperature, but also serves to remove from the surface of the consumed carbon such ash and other products of the combustion as may form upon it, thus leaving the fresh surface of carbon constantly exposed to the action of the electrolyte. All of these are conditions conducive to energetic chemical and electrochemical action, to the prevention of electromotive forces opposed to the proper electromotive forces of such a generator, and to the attainment of the highest degree of efficiency.

In order to secure high electromotive force, the current of large quantity and low electromotive force generated in a single cell may be transformed into high voltage through any well-known method of transformation, or two or more cells embodying the principles above set forth may be employed and coupled up in series, so that the positive pole of one cell will be coupled to the negative pole of the next one, and so on until the desired electromotive force is attained. In the same way two or more such cells may be coupled in multiple arc for low electromotive force and large current. In Fig. 3 I have shown an arrangement of cells in series for high electromotive force.

In an arrangement where several cells are coupled up, either in series or in parallel, it will be understood that the oxygen, as in the form of air, may be supplied to all the cells from a common source, if desired, as, for instance and by way of illustration, the oxygen or air may be supplied to a pipe P under suitable pressure and delivered therefrom, through the pipes J, to the respective cells. Of course any other convenient or desirable arrangement may be employed.

It will be understood that the connection of pipes J with the vessel or receptacle A should be suitably insulated.

As the supply of carbon is exhausted or consumed during the oxidizing process in the transformation of its potential energy into electrical energy fresh carbon may be supplied in any convenient or desirable manner.

In Fig. 1 is shown a translating device R, arranged in circuit with the terminals F C, to be operated by the current generated in the cell.

My invention is not confined to the specific form of apparatus shown and described, nor to the specific electrolyte or negative plate mentioned, nor to the use of air as a source of oxygen supply, as the principles of my invention may be carried out in many different forms of apparatus. Any suitable, convenient, or desirable source of oxygen may be employed and many different kinds of negative plate and electrolyte may be used and still fall within the spirit and scope of my invention.

Some of the desirable characteristics of electrolytes adapted to the purposes of my invention are that they should be liquifiable at a convenient temperature. They should be good conductors of electricity. They should be capable of readily taking up oxygen from the air or other source of oxygen supply and giving up or transferring its oxygen into combination with carbon to form oxids of carbon, so that the carbon is consumed. They should not have any great affinity for the carbon oxids formed, to the end that neither the electrolyte nor the negative plate may be destroyed or subjected to loss of efficiency through chemical combination with the products of the carbon consumption and that such carbon oxids may be readily eliminated. They should not have any considerable affinity for nitrogen or other constituents of air in case air is used. The electrolyte should comprise an oxid or oxids of the metal employed as the negative plate of the cell.

The vessel or receptacle containing the carbon, in case the carbon is employed in such form that it cannot itself form the collecting-electrode or positive plate of the cell, should be of conducting material. I have found iron a satisfactory material out of which this vessel may be constructed.

From the foregoing description it will be seen that the principle of action is as follows: The admission of fresh oxygen or air effects an oxidation of the negative plate, the resulting oxid or oxids forming the electrolyte, which in turn yields up its oxygen to form carbon oxids, which are eliminated, while the metal liberated by such yielding up of oxygen from the oxid electrolyte is returned to the negative plate to be again oxidized by a fresh supply of oxygen or else absorbs the oxygen of an adjacent molecule of the oxid electrolyte.

I have indicated diagrammatically in Fig. 4 my theory of the electrochemical action which takes place. Suppose the plate to the left of said Fig. 4 to be the negative plate, or, say, lead, and which is designated $Pb$, and the plate to the right of said figure to be carbon, and which is designated C. When oxygen is supplied to the lead plate $Pb$, said plate is oxidized and forms an oxid, say, for instance and in the example taken, lead oxid or $PbO$. This is the electrolyte. The several molecules of $PbO$ ranged in line extend from the lead plate to the carbon. At the carbon end of the line the oxygen of the molecule is yielded or given up to the carbon to form carbon oxid, as $CO$ or $CO_2$, while the lead set free absorbs or draws away from the next preceding molecule $PbO$ the oxygen constituent thereof, the place of which is in the same manner supplied from the molecule $PbO$ immediately preceding, and so on throughout, thereby effecting through electrochemical action a progressive transference of the oxygen from the negative plate which absorbed it in the first instance from the oxygen supply, through the electrolyte, to the carbon which it attacks and consumes, the carbon being converted into carbon oxids. This action results in the production of electromotive force. Should, however, the action above described be arrested at any point, the production of electromotive force will cease. For instance, should the production of oxid at the negative plate be arrested, as by stopping the supply of oxygen thereto, then the action of the cell will cease and no electromotive force will be produced; or, should the electrolyte cease to transmit or transfer the oxygen; that is, should the electrochemical action cease, the cell will not generate electricity.

By the use of the term "negative plate" in the foregoing description is meant the plate which corresponds to the copper plate in an ordinary battery and which forms the positive pole of the couple. The carbon in the present invention is considered the positive plate of the cell and forms the negative pole of the couple.

It will be understood, of course, that the negative plate may be a combination of metals instead of a single element and still fall within the spirit and scope of my invention, and the electrolyte may in such case be a combination of several oxids, or it may be a hydrate or even other chemical compounds of elements: but it should always operate to carry by electrochemical action oxygen from the negative to the carbon or positive plate of the cell to effect the required oxidation or consumption thereof, the ultimate result being the formation of oxids of carbon which may be eliminated in a gaseous form.

Having now set forth the object and nature of my invention and an operative and practical application thereof, as illustrative of the principles involved, what I claim as new and useful and of my own invention, and desire to secure by Letters Patent of the United States, is—

1. The method of converting the potential energy of carbon into electrical energy, which consists in subjecting the carbon to the electrochemical action of oxygen through the negative plate of the cell, as and for the purpose set forth.

2. The method of converting the potential energy of carbon into electrical energy, which consists in subjecting the carbon to the electrochemical action of an electrolyte, capable of acting upon the carbon and regenerating the electrolyte through the agency of the negative plate; as and for the purpose set forth.

3. The method of converting the potential energy of carbon into electrical energy, which consists in subjecting the carbon to the action of a decomposable electrolyte, capable of acting upon the carbon and regenerating the electrolyte by supplying oxygen thereto through the agency of the negative plate; as and for the purpose set forth.

4. The method of converting the potential energy of carbon into electrical energy, which consists in subjecting the carbon to the electrochemical action of an electrolyte, capable of acting upon said carbon in the presence of heat and regenerating the electrolyte by supplying the active element thereof through the agency of the negative plate; as and for the purpose set forth.

5. The method of converting the potential energy of carbon into electrical energy, which consists in subjecting the carbon to the action of a decomposable electrolyte and simultaneously therewith regenerating said electrolyte by supplying oxygen thereto through the agency of the negative plate; as and for the purpose set forth.

6. The method of converting the potential energy of carbon into electrical energy, which consists in subjecting the carbon to the action of a decomposable oxid and then supplying oxygen to said oxid through the agency of the metallic base of such oxid to regenerate the same; as and for the purpose set forth.

7. The method of converting the potential energy of carbon into electrical energy, which consists in subjecting the carbon to the electrochemical action of a decomposable electrolyte containing oxygen and capable of yielding its oxygen, and then regenerating such oxid through the agency of the negative plate by the addition thereto of fresh oxygen; as and for the purpose set forth.

8. The method of generating electricity from carbon which consists in oxidizing a negative plate in the presence of an electrolyte adapted to transfer the oxygen to the carbon, as and for the purpose set forth.

9. The method of generating electricity from carbon which consists in forming oxids of the negative plate and then subjecting the carbon to the action of such oxid as and for the purpose set forth.

10. The method of converting the potential energy of carbon into electrical energy which consists in supplying oxygen to the negative plate to form an oxid thereof and then subjecting the carbon to the electrochemical action of such oxid, as and for the purpose set forth.

11. The method of converting the potential energy of carbon into electrical energy which consists in supplying air to the negative plate to form an oxid thereof and then subjecting the carbon to the electrochemical action of such oxid, as and for the purpose set forth.

12. The method of converting the potential energy of carbon into electrical energy which consists in supplying blasts of air to the negative plate to form an oxid thereof and then subjecting the carbon to the electrochemical action of such oxid, as and for the purpose set forth.

13. The method of converting the potential energy of carbon into electrical energy which consists in forming an oxid from the negative plate of a cell and subjecting the carbon to the action of such oxid, and maintaining the whole in a heated condition, as and for the purpose set forth.

14. The method of converting the potential energy of carbon into electrical energy which consists in forming an oxid from the negative plate of a cell and subjecting the carbon to the electrochemical action of such oxid in the presence of heat, as and for the purpose set forth.

15. The method of converting the potential energy of carbon into electrical energy which consists in supplying oxygen to the negative plate in the presence of heat and then subjecting the carbon to the electrochemical action of the resulting oxid, as and for the purpose set forth.

16. The method of converting the potential energy of carbon into electrical energy which consists in supplying oxygen in a heated condition to the negative plate of a cell and then subjecting the carbon to the electrochemical action of the resulting oxid, as and for the purpose set forth.

17. The method of converting the potential energy of carbon into electrical energy which consists in maintaining the negative plate in molten condition, then supplying oxygen thereto and finally subjecting the carbon to the electrochemical action of the resulting oxid, as and for the purpose set forth.

18. The method of converting the potential energy of carbon into electrical energy which consists in reducing the negative plate to molten state by subjecting the same to hot air, and then subjecting the carbon to the electrochemical action of the resulting oxid, as and for the purpose set forth.

19. The method of converting the potential energy of carbon into electrical energy which consists in subjecting the negative plate to hot air whereby it is reduced to molten state and is oxidized, and then subjecting the carbon to the electrochemical action of such oxid, as and for the purpose set forth.

20. The method of converting the potential energy of carbon into electrical energy which consists in oxidizing lead and then subjecting the carbon to the electrochemical action of the lead oxid, as and for the purpose set forth.

21. An apparatus for converting the potential energy of carbon into electrical energy comprising the combination of a negative plate adapted to receive oxygen and an electrolyte adapted to transfer the oxygen to the carbon, as and for the purpose set forth.

22. As a generator of electricity, an oxidizable plate, a carbon plate and an intervening electrolyte adapted to transfer electrochemically the oxygen from such oxidizable plate to the carbon plate, as and for the purpose set forth.

23. As a generator of electricity, an oxidizable plate, a carbon plate and an intervening molten mass or electrolyte adapted to transfer electrochemically the oxygen from such oxidizable plate to the carbon as and for the purpose set forth.

24. As a generator of electricity, a lead plate, a carbon plate and an intervening lead oxid and means for supplying oxygen to said lead plate, as and for the purpose set forth.

25. The combination of a carbon plate, a plate of material negative as compared with carbon, an electrolyte medium connecting said plates, and means for supplying oxygen to said medium through the agency of said negative material; as and for the purpose set forth.

In witness whereof I have hereunto set my hand, this 7th day of April, 1896, in the presence of two subscribing witnesses.

SIDNEY H. SHORT.

Witnesses:
FRANK T. BROWN,
S. E. DARBY.